(12) United States Patent
Matsushita et al.

(10) Patent No.: US 7,626,548 B2
(45) Date of Patent: Dec. 1, 2009

(54) ANTENNA CIRCUIT, IC INLET AND IC TAG

(75) Inventors: Taiga Matsushita, Tokyo (JP);
Yasukazu Nakata, Tokyo (JP);
Takakazu Murakami, Tokyo (JP)

(73) Assignee: Lintec Corporation, Itabashi- Ku, Tokyo (JP)

( * ) Notice: Subject to any disclaimer, the term of this patent is extended or adjusted under 35 U.S.C. 154(b) by 52 days.

(21) Appl. No.: 11/570,656

(22) PCT Filed: Jun. 20, 2005

(86) PCT No.: PCT/JP2005/011673

§ 371 (c)(1),
(2), (4) Date: Aug. 28, 2007

(87) PCT Pub. No.: WO2006/003851

PCT Pub. Date: Jan. 12, 2006

(65) Prior Publication Data

US 2008/0036677 A1    Feb. 14, 2008

(30) Foreign Application Priority Data

Jul. 1, 2004    (JP)    ............................. 2004-195949

(51) Int. Cl.
*H01Q 1/38* (2006.01)
*H01Q 1/36* (2006.01)

(52) U.S. Cl. ................................. 343/700 MS; 343/895

(58) Field of Classification Search ........................ None
See application file for complete search history.

(56) References Cited

U.S. PATENT DOCUMENTS

| 6,089,461 | A | * | 7/2000 | Murohara | .................... 235/492 |
| 7,434,739 | B2 | * | 10/2008 | Matsuura et al. | ............ 235/492 |
| 2001/0020895 | A1 | | 9/2001 | Suzuki et al. | |
| 2005/0134461 | A1 | * | 6/2005 | Gelbman et al. | .......... 340/572.8 |

FOREIGN PATENT DOCUMENTS

| CN | 1313574 A | 9/2001 |
| JP | 10 49756 A | 2/1998 |
| JP | 2000 57292 A | 2/2000 |
| JP | 2000 90224 A | 3/2000 |
| JP | 2001 43337 A | 2/2001 |
| JP | 2002 366916 A | 12/2002 |

\* cited by examiner

*Primary Examiner*—Trinh V Dinh
(74) *Attorney, Agent, or Firm*—Norris, McLaughlin & Marcus, PA

(57) ABSTRACT

The present invention discloses:

an IC inlet 110 which comprises a substrate 2, a surface circuit including a plain coil circuit portion 6 formed on the substrate and opposed electrodes 8 and 12 individually connected with the two ends of the plain coil circuit portion 6, and an IC chip 16 mounted in connection with the opposed electrodes, wherein a cut-away broken line 22 formed in at least a portion of the surface circuit so as to pass through the substrate and the surface circuit, and IC tag which is produced by the use of the IC inlet.

6 Claims, 8 Drawing Sheets

ANTENNA CIRCUIT, IC INLET AND IC TAG

RELATED APPLICATIONS

This application is a 371 of PCT/JP05/11673 filed Jun. 20, 2005, which claims priority under 35 U.S.C. 119 to an application filed in the Japan on Jul. 1, 2004, the contents of which are incorporated herein by reference.

TECHNICAL FIELD

The present invention relates to a non-contact IC tag used in personal certification, merchandise management, physical distribution management, etc.

BACKGROUND ART

In recent years, there has been widely used non-contact IC tag which is fitted to to-be-controlled persons or goods (adherends) for control of circulation, etc. of such persons or goods. This IC tag can memorize and store data in an IC chip built therein. Further, since the IC tag can communicate in non-contact with a interrogator via a radio wave, the data memorized in the IC chip can be exchanged with the interrogator.

As the application fields of IC tag, there are various fields, for example, its use being inside of communication ticket for control of section of riding or fare, control of coming and goings of peoples in business, etc., stock control of goods, control of physical distribution, etc. IC tags of various forms are being produced so as to match such application fields.

Throw-away IC tag is fitted to, for example, a commodity and is placed at a shop together with the commodity; when the commodity has been sold, the data memorized in the IC chip is read by a interrogator. Thereby, the role of the IC tag is over.

In the throw-away IC tag whose role has been over, the data memorized in the IC chip remains still. Therefore, the control manage of the data memorized in the IC chip of used IC tag is important. As an example of improper use of the data memorized in the used IC tag, there is a case that the IC tag (which was fitted to a commodity and used properly) is peeled from the commodity, the data memorized in the IC chip is read, and this data is used illegally. It is also considered that the memorized data of the discarded IC tag is falsified for illegal use.

In order to prevent such illegal use, it is preferred to deactivate the function of used IC tag. As the deactivation method, there is proposed a method of cutting the electronic circuit contained in an IC tag, with scissors or the like (JP 2002-366916A, paragraph No. 0033). In this proposal, however, a labor of cutting an electronic circuit is needed for deactivation, which does not match a requirement for automation.

There is also a proposal of forming in advance, in the substrate of IC tag, portions of different peeling strengths so that, when the IC tag is peeled from a commodity and recovered, the electronic circuit of the IC tag can be destroyed (JP 2000-57292A, claim 1). In this proposal, since the destruction of electronic circuit takes place owing to the difference in peeling strength, stable control of peeling strength is important. Further, there is required a step for forming a peeling layer having different peeling strengths, increasing the number of steps for IC tag production.

DISCLOSURE OF THE INVENTION

The present inventors made a study in order to solve the above problems. In the course of the study, the present inventors thought of forming in advance a cut-away broken line (a perforation) in the electronic circuit constituting an IC tag. It was found, for example, that, owing to the cut-away broken line, the electronic circuit of a used IC tag can be reliably destroyed and deactivated and that the formation of such a cut-away broken line can be conducted in the step of IC tag production, of cutting into individual tags and no special or additional step is needed. These findings have led to the completion of the present invention.

Accordingly, the aim of the present invention lies in providing an IC tag which can solve the above-mentioned problems.

The present invention which achieves the above aim, is described below.

[1] An antenna circuit characterized by comprising:
  a substrate,
  a surface circuit including a plain coil circuit portion and at least one pair of opposed electrodes individually connected with the two ends of the plain coil circuit portion which are formed on a surface of the substrate, and
  a cut-away broken line formed so as to pass through the substrate and the surface circuit.

[2] An antenna circuit according to [1], wherein the cut-away broken line forms a closed portion passing through at least the substrate and the opposed electrodes.

[3] An antenna circuit according to [1], wherein the cut-away broken line has at least a non-cut-away portion of 0.08 to 1.5 mm in length.

[4] An IC inlet characterized by comprising:
  an antenna circuit set forth in any of [1] to [3], and
  an IC chip mounted in connection with the opposed electrodes of the antenna circuit.

[5] An IC tag comprising an IC inlet set forth in [4] and an adhesive layer formed on at least one side of the substrate of the IC inlet.

[6] An IC tag characterized by comprising:
  an IC inlet comprising a substrate, a surface circuit including a plain coil circuit portion and at least one pair of opposed electrodes individually connected with the two ends of the plain coil circuit portion which are formed on the substrate, and an IC chip mounted in connection with the opposed electrodes,
  a surface protective layer formed on at least one side of the IC inlet, and
  a cut-away broken line formed so as to pass through the substrate, the surface circuit and the surface protective layer.

[7] An IC tag according to [6], wherein the cut-away broken line forms a closed portion passing through at least the substrate, the opposed electrodes and the surface protective layer.

[8] An IC tag according to [6], wherein the cut-away broken line has at least a non-cut-away portion of 0.08 to 1.5 mm in length.

[9] An IC tag according to any of [6] to [8], wherein the surface protective layer has a display layer.

The antenna circuit of the present invention has a cutaway broken line formed in advance therein. Therefore, in the IC tag or IC card obtained by mounting an IC chip in the antenna circuit, after it has been used, the antenna circuit is cut easily along the cut-away broken line. As a result, the IC tag or IC card is deactivated reliably. In a case of, for example, an IC tag wherein a cutaway broken line is formed so as to surround an IC chip, when the IC tag has been used and is peeled and collected from its adherend, the IC tag is cut along the cut-away broken line and the IC chip is collected easily. In this case, the antenna circuit is disconnected along the cut-away broken line and the function of IC tag is deactivated reliably.

The step for formation of the cut-away broken line in mass production can be included in a step of IC tag production, of cutting into individual IC tags, whereby an increase in the number of steps can be avoided.

When there is formed a cut-away broken line so as to surround an IC chip, the absence of IC chip portion (which has been cut along the cut-away broken line) can be confirmed visually, whereby the deactivation of IC tag can be confirmed easily and realiably. This is the same also in the case of IC card.

100 is an antenna circuit; 110 is an IC inlet; 120 is an IC tag fitted with a release material; 130, 140, 150, 160, 180 and 190 are each an IC tag; 2 is a substrate; 4 is a taking-out electrode; 6 is a plain coil circuit portion; 8 is one opposed electrode; 10 is an insulating layer; 12 is other opposed electrode; 14 is a jumper; 16 is an IC chip; 18 and 20 are each a lead portion; 22 is a cut-away broken line; 24 is a closed portion; 26 is an adhesive layer; 28 is a release material; 32 is a cut-away portion; X is a length of cut-away portion; 34 is a non-cut-away portion; Y is a length of non-cut-away portion; and a and b are each a length of cut-away broken line.

42 is an adherend; 44 is an IC chip area; 46 is a peeled portion; 52 is an intermediate film; 54 is a surface protective layer; 56 is an indicate layer; 62 and 64 are each a surface protective layer; 66 is a cut-away broken line; and 68 is a resin layer.

BEST MODE FOR CARRYING OUT THE INVENTION

Description is made below on the modes of the present invention with reference to the accompanying drawings.

(Antenna Circuit)

Figure 1:
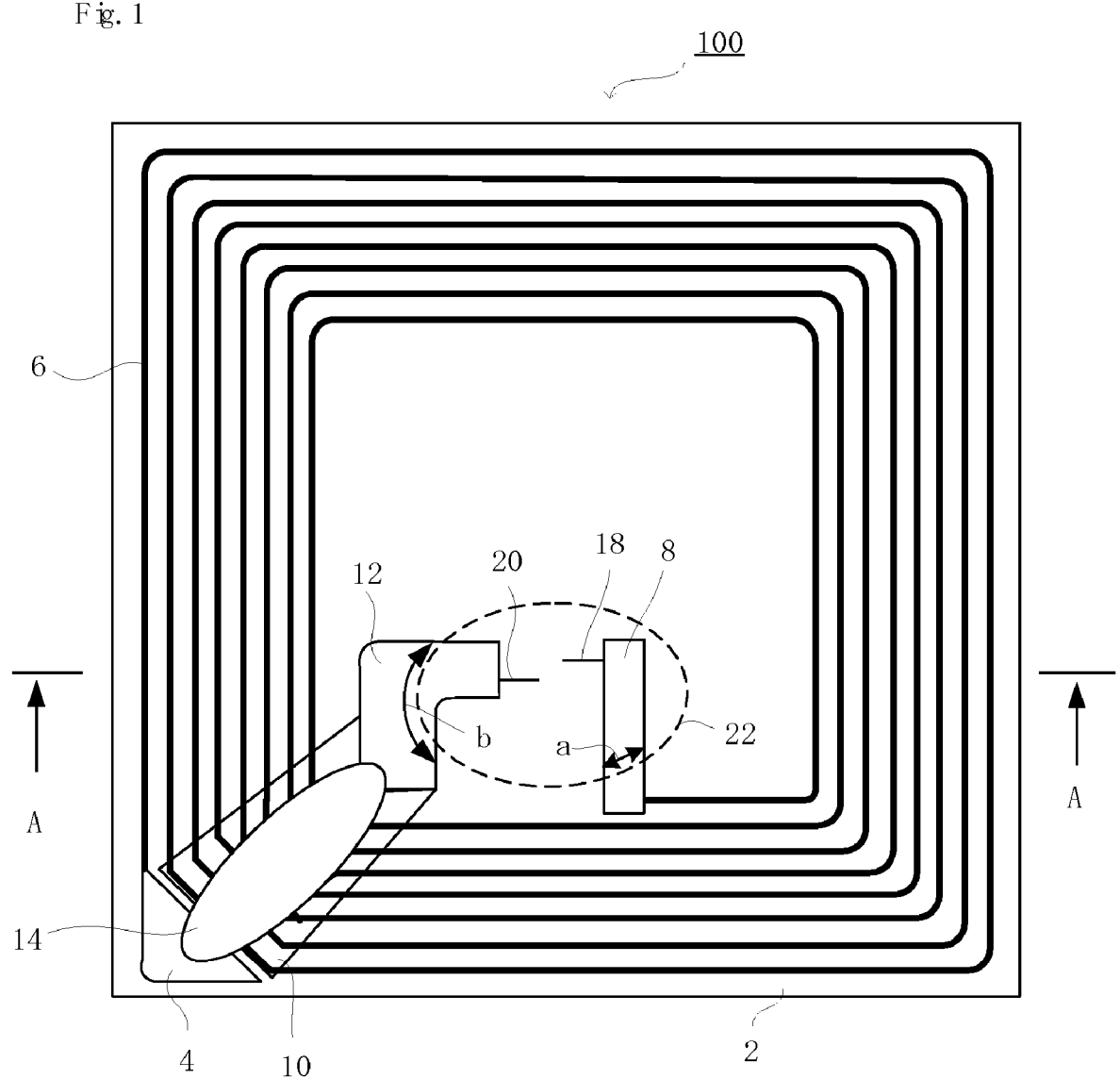
FIG. 1 is a plan view showing an example of the antenna circuit of the present invention.
Figure 2:
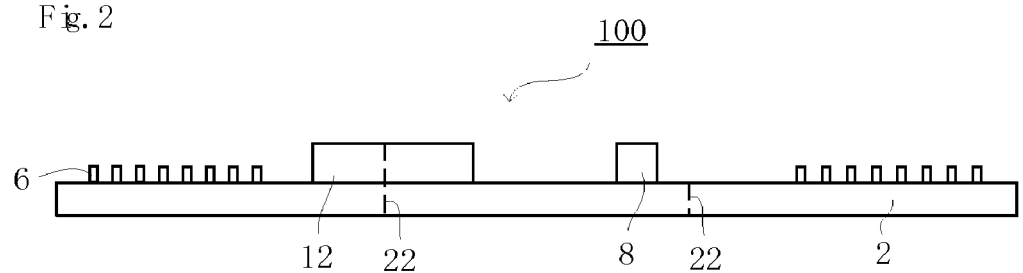
FIG. 2 is an end face view taken along the A-A line of FIG. 1.

FIG. 1 is a plan view showing an example of the antenna circuit of the present invention, and FIG. 2 is a schematic end face view taken along the A-A line of FIG. 1.

In FIG. 1, 100 is an antenna circuit and 2 is a substrate. This substrate 2 has a function for supporting a surface circuit, an IC chip, etc. all described later. The substrate 2 is preferably a paper (e.g. wood-free paper or coated paper), a synthetic resin film, or the like. The resin material constituting the synthetic resin film is not particularly restricted; and there can be mentioned, for example, polyethylene, polypropylene, polyvinyl chloride, polystyrene, polyester, polyvinyl acetate, polybutene, polyacrylic acid ester, polymethacrylic acid ester, polyacrylonitrile, polyimide, polycarbonate, polyamide, ethylene-vinyl acetate copolymer, polyvinyl acetal, and acrylonitrile-butadiene-styrene copolymer. There is no particular restriction as to the thickness of the substrate 2. There can be used any of those which have been marketed or produced heretofore.

At one corner of the substrate 2, a taking-out electrode 4 is formed with a conductive paste such as silver paste or the like.

On one side of the substrate 2 is formed a plain coil circuit portion 6 of rectangular and spiral shape. One outer end of the plain coil circuit portion 6 is connected with the taking-out electrode 4. Other inner end of the plain coil circuit portion 6 is connected with one opposed electrode 8.

In the vicinity of the taking-out electrode 4 is formed an insulating layer 10 so as to cover the upper surface of the plain coil circuit portion 6. In the vicinity of the insulating layer 10 and inside the plain coil circuit portion 6 is formed other opposed electrode 12. The one opposed electrode 8 and the other opposed electrode 12 are formed apart by a given distance so as to oppose each other. Incidentally, 18 and 20 are lead portions which are connected with the opposed electrodes 8 and 12, respectively, are connected with an IC chip described later.

On the insulating layer 10 is formed a jumper 14. By this jumper, there are electrically connected the taking-out electrode 4 and the other opposed electrode 12.

Here, the taking-out electrode 4, plain coil circuit portion 6, two opposed electrodes 8 and 12, jumper 14, lead portions 18 and 20, etc., all formed on one side of the substrate constitute an electronic circuit, and hereinafter they are given a general term of "surface circuit". This surface circuit may be formed with a conductive metal (e.g. gold, silver, copper or aluminum), a conductive paste (e.g. silver paste) or a conductive ink. The surface circuit may also be formed by printing the above-mentioned conductive metal laminated on the substrate 2 with a resist pattern by screen printing and removing the unnecessary metal portions by etching thereafter.

In FIG. 1, 22 is a cut-away broken line (a perforation) and is formed so as to pass through the opposed electrodes 8 and 12 and surround an IC chip 16 described later. By this cut-away broken line 22, a closed portion 24 which divides the IC chip from other portion of the antenna circuit 100 is formed.

Incidentally, the cut-away portion of the cut-away broken line 22 is formed so as to pass through the two electrodes 8 and 12 and the substrate 2.

In a mass production process, it is preferred to use, an extracting device installed cutting blade which has a shape for formation of cut-away broken line 22 and individual antenna circuit in the step of cutting into them. By the use of such an extracting device installed cutting blade, there can be formed each antenna circuit and simultaneously a cut-away broken line.

Figure 5:
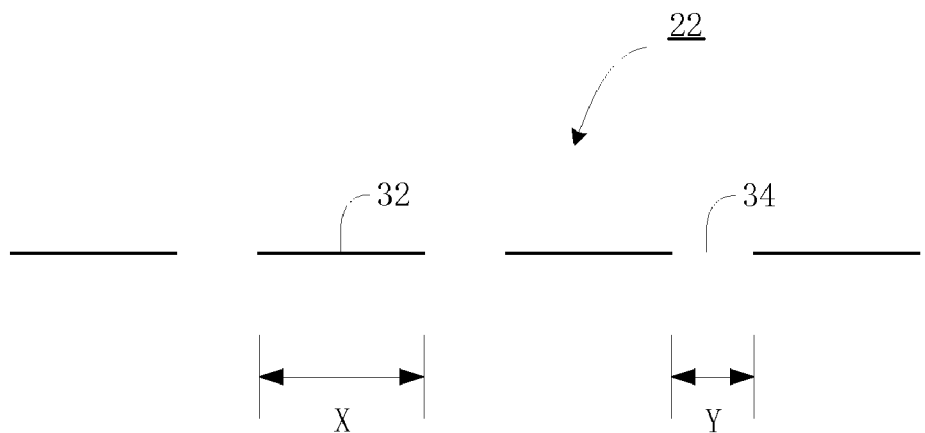
FIG. 5 is an enlarged view showing an example of the cut-away broken line.

FIG. 5 is a partially enlarged view of the cut-away broken line 22. The cut-away broken line 22 consists of a cut-away portion 32 (its length: X) and a non-cut-away portion 34 (its length: Y).

In the cut-away broken line 22, the ratio of the length Y of non-cut-away portion and the length X of cut-away portion is preferably 1:1 to 1:20, more preferably 1:2 to 1:15.

In the cut-away broken line 22, the length Y of non-cut-away portion is preferably 0.08 to 1.5 mm, more preferably 0.2 to 1 mm, further preferably 0.4 to 0.8 mm. When the length Y of non-cut-away portion is less than 0.08 mm, exact formation of non-cut-away portion 34 is difficult and breakage of non-cut-away portion takes place easily. When the length Y of non-cut-away portion exceeds 1.5 mm, reliable breakage of IC tag circuit may not take place in the later-described operation for deactivation of the function of IC tag.

As shown in FIG. 1, the lengths a and b of the cut-away broken line in which the line crosses the opposed electrodes 8 and 12, are each preferably 1 mm or more, more preferably 2 to 10 mm. When the lengths a or b of the cut-away broken line are each less than 1 mm, the response sensitivity of IC tag may be low.

Figure 8:
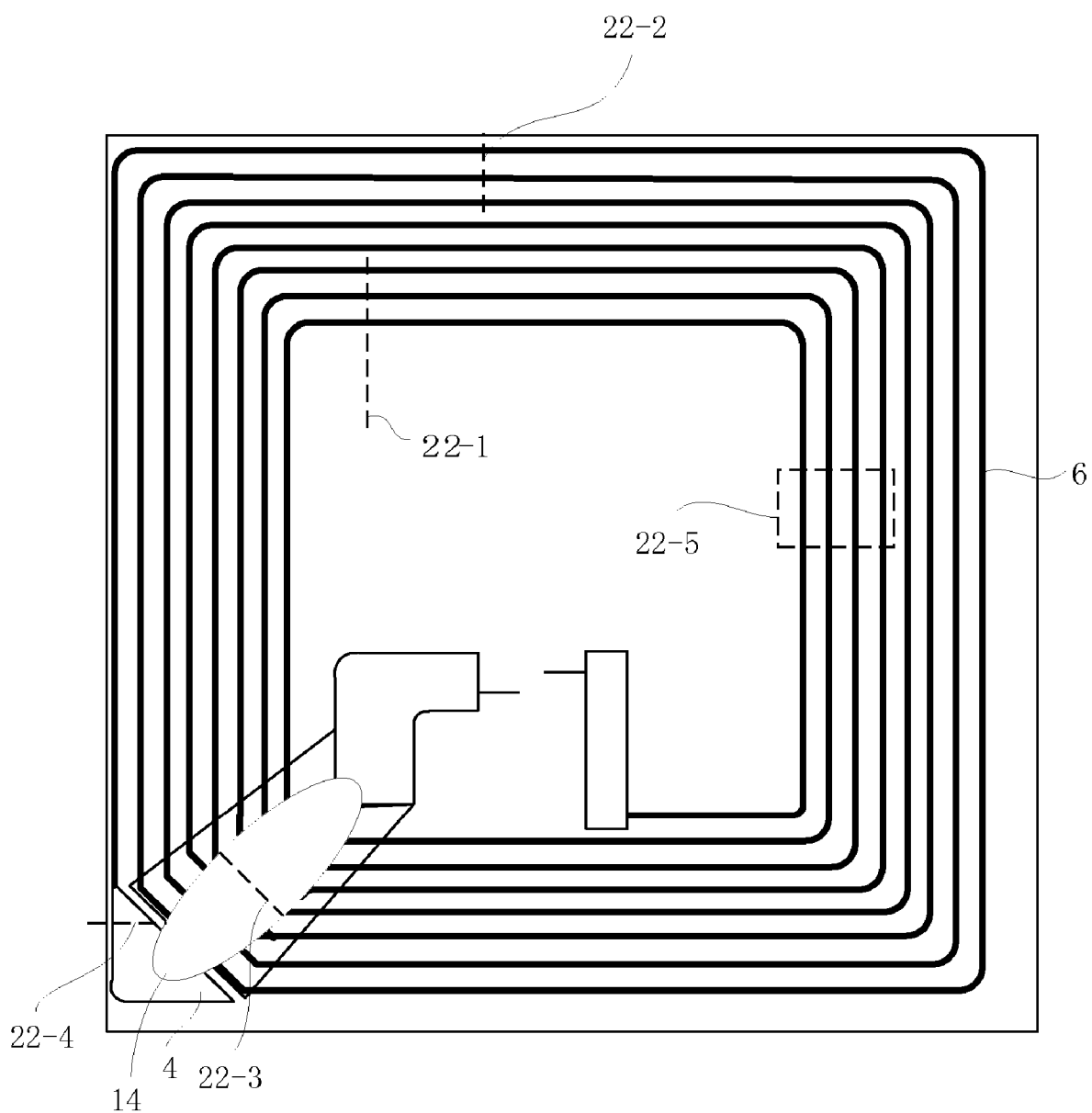
FIG. 8 is a plan view showing other example of the cut-away broken line of the antenna circuit of the present invention.

FIG. 8 shows other example of the cut-away broken line of the antenna circuit of the present invention.

In this example, the cut-away broken line is formed at desired places of the surface circuit, in desired shapes, and in desired lengths.

In FIG. 8, 22-1 is a linear cut-away broken line formed for several inner turns (three turns in this figure) of plain coil circuit portion 6.

22-2 is a linear cut-away broken line formed for several outer turns (three turns in this figure) of plain coil circuit portion 6.

22-3 is a linear cut-away broken line formed for jumper 14.

22-4 is a linear cut-away broken line formed for taking-out electrode 4.

22-5 is a rectangular cut-away broken line formed for several inner turns (four turns in this figure) of plain coil circuit portion 6.

In the present invention, the substrate 2, the surface circuit formed on the substrate 2, and the cut-away broken line 22 to be described later are given, in combination, a general term of "antenna circuit".

(IC Inlet)

Figure 3:
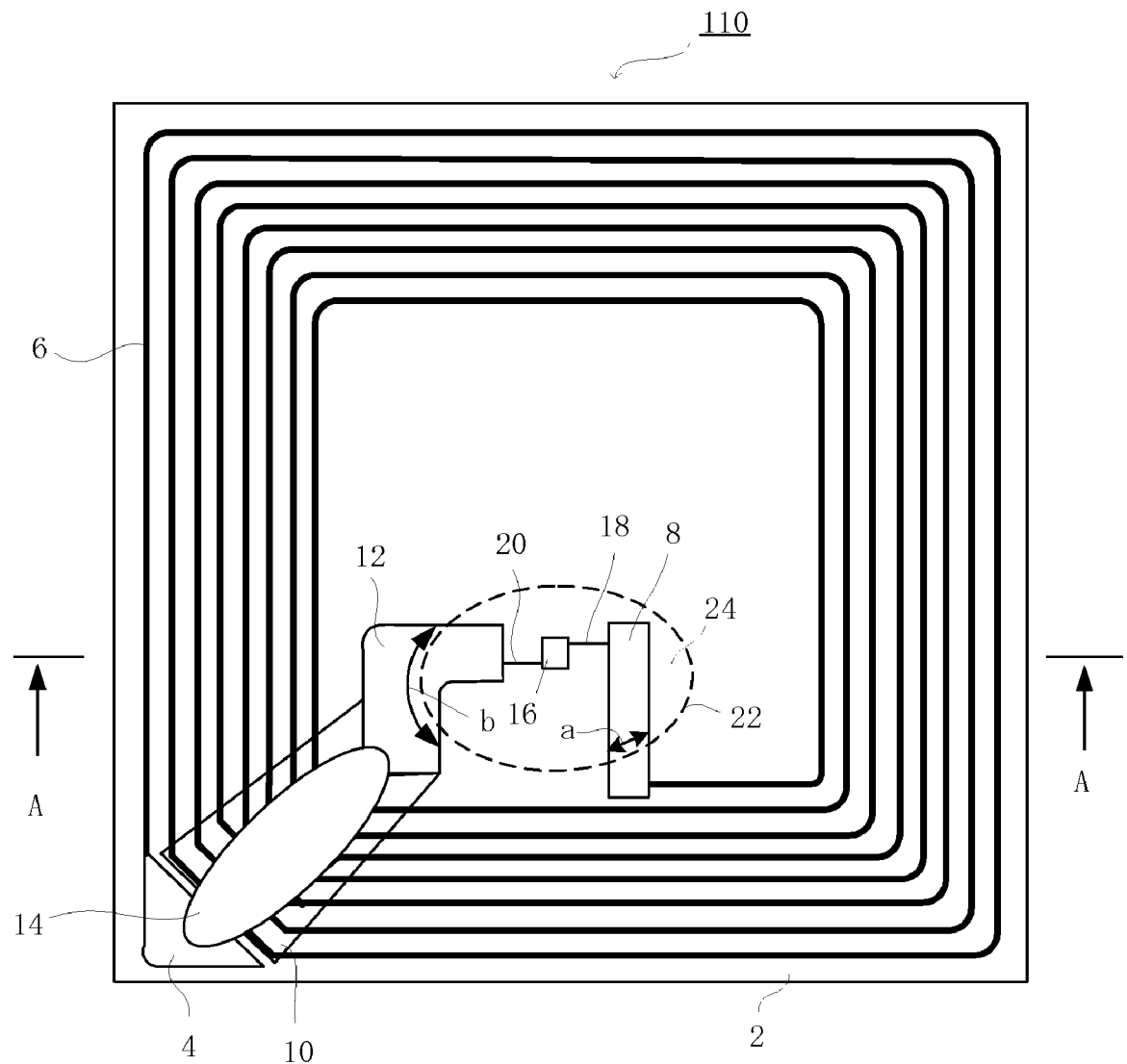
FIG. 3 is a plan view showing an example of the IC inlet of the present invention.
Figure 4:
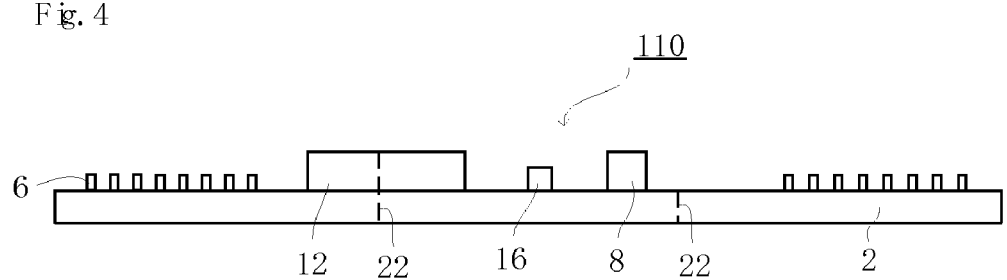
FIG. 4 is an end face view taken along the A-A line of FIG. 3.

FIG. 3 shows an IC inlet 110 which comprises an antenna circuit shown in FIG. 1 and an IC chip 16 mounted between the two opposed electrodes 8 and 12 of the antenna circuit. The IC chip 16 and the two opposed electrodes 8 and 12 are electrically connected with each other by lead portions 18 and 20. FIG. 4 is a schematic end face view taken along the A-A line of FIG. 3.

In the mounting of an IC chip, an adhesive material such as anisotropic conductive adhesive (ACP) is coated on the lead portions of the surface circuit, and the IC chip is fitted with a wire bump or a plated bump and is mounted on the lead portions of the surface circuit. Fixation of the IC chip is conducted by, for example, thermocompression bonding.

In the present invention, a product as shown in FIG. 3, obtained by mounting an IC chip 16 in an antenna circuit 100 shown in FIG. 1 is given a general term of "IC inlet 110".

(IC Tag)

In the present invention, IC tag is defined as a product obtained by applying some processing to the above-mentioned IC inlet.

As the processing applied, there can be mentioned, for example, processing in which an adhesive layer is formed on at least one side of IC inlet; processing in which a surface protective layer is formed on at least one side of IC inlet; processing in which a release layer is formed on at least one side of IC inlet; and processing in which an IC inlet is buried in a resin and is formed into a card.

(First Form)

Figure 6:
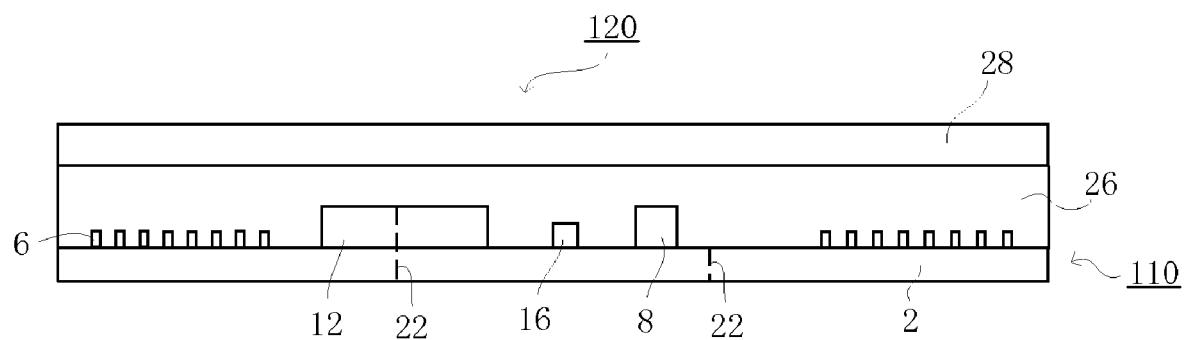
FIG. 6 is an end face view showing an example of the IC tag of the present invention.

FIG. 6 shows an IC tag 120 in which an adhesive layer 26 is formed on the whole surface of one side of a substrate on which the surface circuit of an IC inlet 110 shown in FIG. 4 has been formed. Onto the adhesive layer 26 is further laminated a release material 28 in order to protect the adhesive layer.

As the adhesive used in the adhesive layer 26, there can be used a known adhesive or pressure-sensitive adhesive with no restriction. As specific examples, there can be mentioned an acrylic-based adhesive, a urethane-based adhesive, a natural rubber- or synthetic rubber-based adhesive, a silicone resin-based adhesive, a polyolefin-based adhesive, a polyester-based adhesive, and an ethylene/vinyl acetate-based adhesive.

The adhesive layer 26 is formed by coating an adhesive on the release treatment side of a release material 28 and laminating the adhesive-coated side of the release material onto the side of a substrate 2 on which a surface circuit has been formed. Or, an adhesive may be coated on the side of a substrate 2 on which a surface circuit has been formed, followed by lamination of a release material onto the coated adhesive.

As the release material, there can be used any commercial release material. There can be used, for example, a release material obtained by using, as a base material, a film made of a resin (e.g. polyethylene terephthalate, polybutylene terephthalate, polyethylene, polypropylene or polyarylate) or a paper (e.g. polyethylene-laminated paper, polypropylene-laminated paper, clay-coated paper, resin-coated paper, or glassine paper) and, as necessary, subjecting the side of the base material to be laminated with the above-mentioned adhesive layer, to a release treatment. As a representative example of the release treatment, there can be mentioned a treatment of forming a release agent layer using a release agent such as silicone type resin, long-chain alkyl type resin, fluoroplastic or the like. As to the thickness of the release material, there is no particular restriction, and the thickness can be selected appropriately.

As the method for forming an adhesive layer on the release treatment side of a release material, there can be mentioned, for example, a method of coating an adhesive by the use of air knife coater, blade coater, bar coater, gravure coater, roll coater, curtain coater, die coater, knife coater, screen coater, Meyer bar coater, kiss coater or the like, followed by drying.

Figure 7:
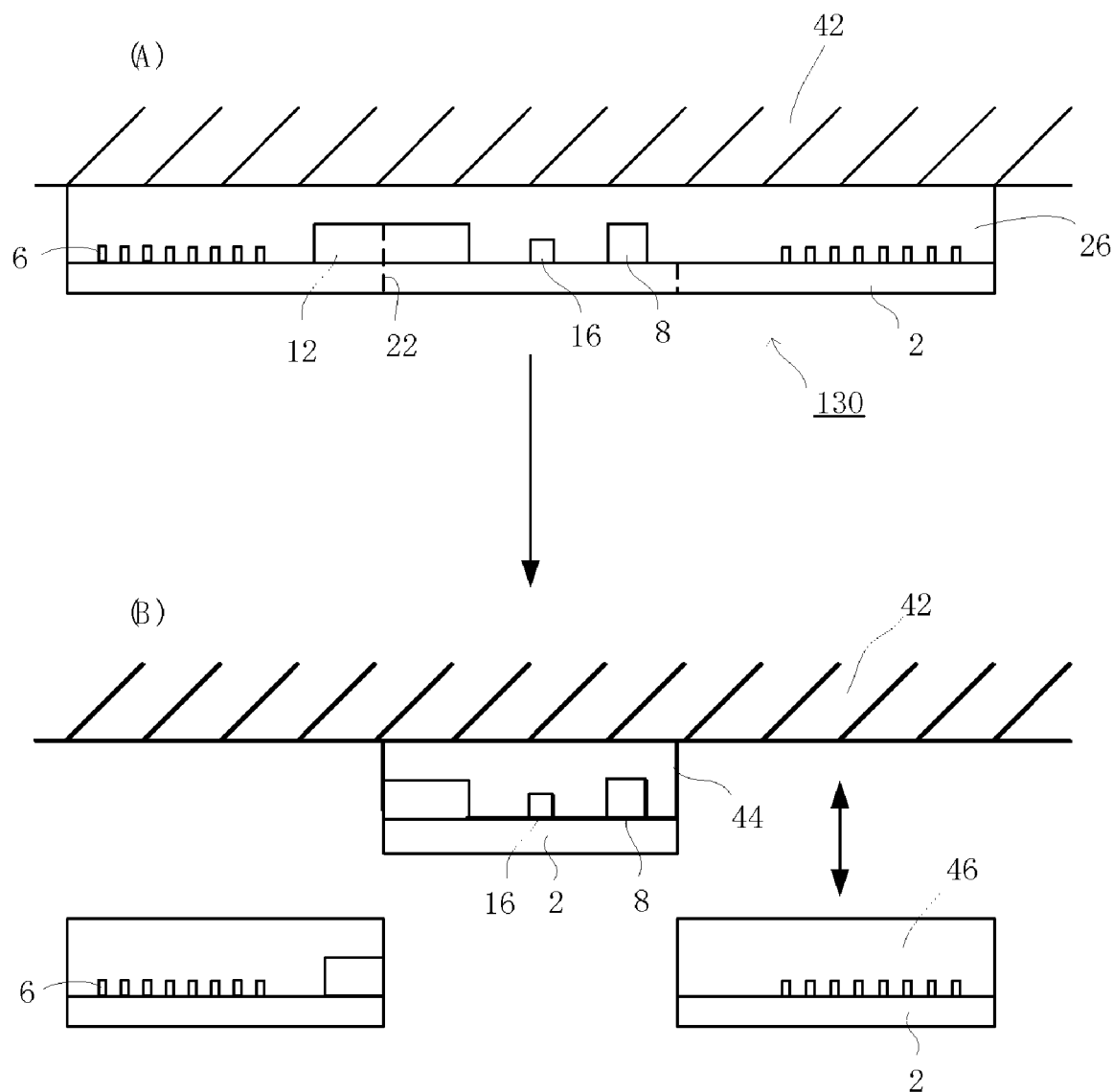
FIG. 7 is a drawing showing a deactivation process of the IC tag of the present invention.

Next, the method for using a release material-fitted IC tag 120 shown in FIG. 6 is described with reference to FIG. 7.

At first, a release material 28 is peeled from an IC tag 120 shown in FIG. 6 and, as shown in FIG. 7(A), the IC tag 130 is adhered onto a adherend 42 which is a subject to data control. In this state, the adherend 42 is circulated in the market, etc. and then the data stored in the IC chip 16 is read by a interrogator, whereby intended data control is made. Thereby, the role of data control of the IC tag 130 is over.

Then, the IC tag 130 is peeled from the adherend 42 and discarded. In this case, since a cut-away broken line 22 is beforehand formed in the IC tag, the substrate 2 and the opposed electrodes 8 and 12 are cut along the cut-away broken line 22 surrounding the IC chip 16. As a result, an IC chip portion 44 is left in the adherend 42. Thus, the electronic circuit formed on the substrate 2 is destroyed and the IC tag is deactivated reliably. Further, since the IC chip portion 44 left in the adherend 42 is small, there is no substantial restoration of electronic circuit even if the peeling portion 46 has been adhered again. Thus, deactivation is carried out reliably and there is no restoration.

In the above use method, the portion (peeling portion 46) of IC tag, other than the IC chip portion 44 was peeled from the adherend 42 and the IC chip portion 44 was allowed to remain in the adherend 42; however, other method is possible. That is, the IC chip portion 44 may be cut along the cut-away broken line 22 and be peeled from the adherend 42. In this case, since the IC chip 16 is left at hand, there is no fear of falsification of data inside IC chip 16 by others, offering high safety.

When there are used cut-away broken lines shown in FIG. 8, deactivation of IC tag can be effected by cutting cut-away broken lines 22-1 to 22-5 by means of pressing or the like.

While the above description has been made, the above constitution may be modified appropriately as long as there is no deviation from the gist of the present invention.

Figure 9:
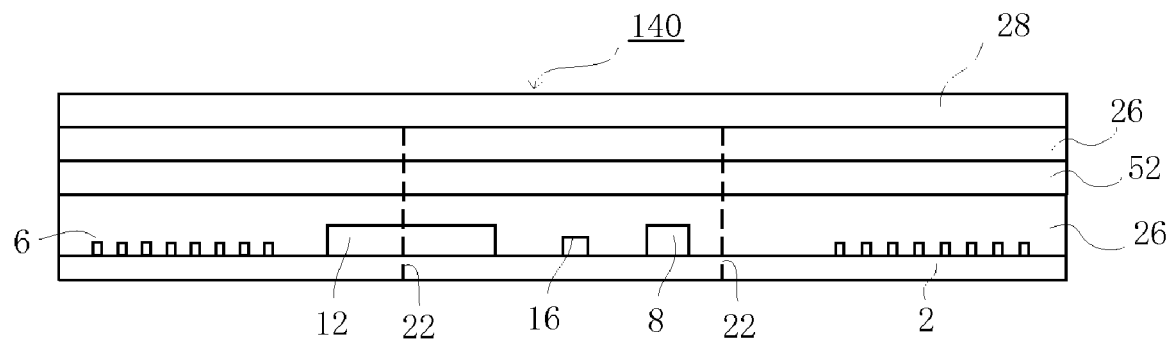
FIG. 9 is an end face view showing other example of the IC tag of the present invention.

FIG. 9 shows other constitution of the IC tag of the present invention. In an IC tag 140 of this example, an intermediate film 52 is inserted into an adhesive layer 26. By insertion of the intermediate film 52, the surface unevenness of adhesive layer 26, caused by IC chip 16, plain coil circuit portion 6, etc. is alleviated and adhesion of IC tag 140 onto adherend is made reliably. Incidentally, a cut-away broken line is formed even through the intermediate film 52.

As the intermediate film 52, there can be mentioned, for example, those materials used for the substrate.

Figure 10:
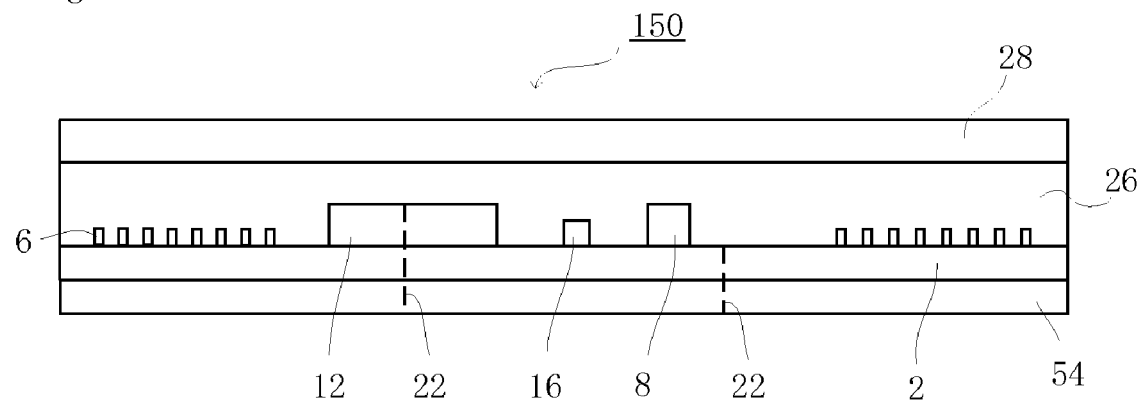
FIG. 10 is an end face view showing still other example of the IC tag of the present invention.

FIG. 10 shows still other constitution example of the IC tag of the present invention. In an IC tag 150 of this example, a surface protective layer 54 is laminated onto the side of a substrate 2, which side is opposite to its side having a plain coil circuit portion 6 formed thereon.

As the surface protective layer 54, there can be appropriately used those materials used for the substrate 2.

As the method for lamination of surface protective layer 54, there can be appropriately used, for example, a method of bonding by the use of adhesive or a method of bonding by thermocompression bonding.

By lamination of surface protective layer 54 onto substrate 2, IC tag can be effectively protected from friction, impact, etc.

The surface protective layer 54 may be constituted also by a material on which data, letters, patterns (e.g. bar code), etc. can be printed. Such a surface protective layer 54 is convenient because data, letters, bar codes, etc. can be recorded on the surface of the surface protective layer 54.

Figure 11:
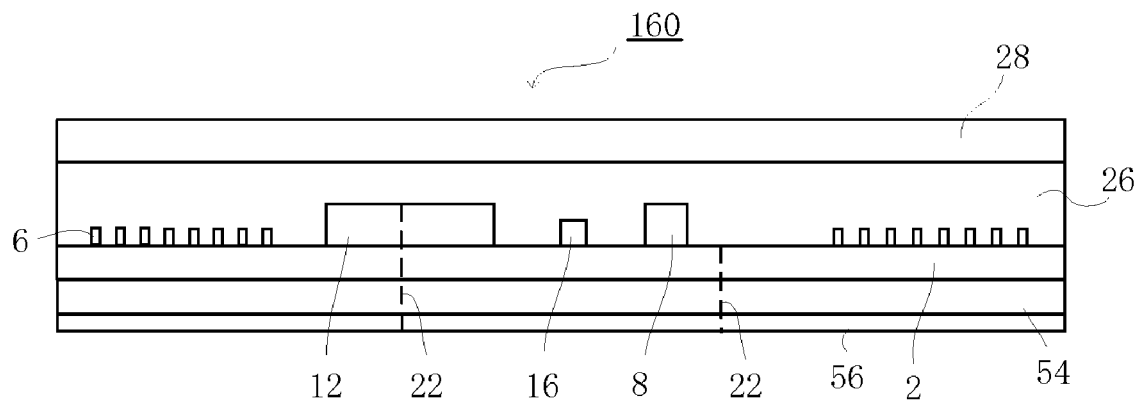
FIG. 11 is an end face view showing still other example of the IC tag of the present invention.

Further, as shown in an IC tag 160 of FIG. 11, an indicate layer (e.g. an ink-receptive layer) 56 may be formed on the surface of a surface protective layer 54. The indicate layer 56 is preferably constituted so that the layer is suited for printing of data, letters, patterns (e.g. bar code), etc. Such a display layer 56 is convenient because data, letters, patterns (e.g. bar code), etc. can be recorded on the indicate layer 56.

Incidentally, in the above drawings, the same numerals are used for the same sites, and no explanation therefore is made.

(Second Form)

The IC tag of the present invention can also have a constitution explained below.

That is, in the second form, an IC inlet is sealed in surface protective layers made of two base materials and is formed into a so-called card form.

Figure 12:
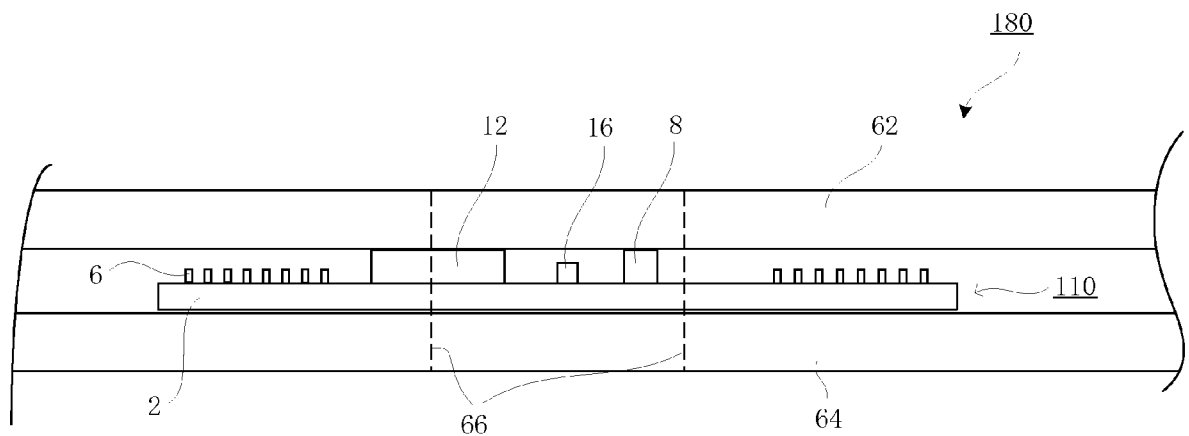
FIG. 12 is an end face partial view showing an example of the card-shaped IC tag of the present invention.

FIG. 12 shows an example of the constitution of an IC card-shaped IC tag 180 using an IC inlet 110.

In this IC tag 180, an IC inlet 110 is sandwiched between surface protective layers 62 and 64 made of two base materials. A circular cut-away broken line 66 is formed so as to pass through the surface protective layer 62, the IC inlet 110 and the surface protective layer 64. As the surface protective layers 62 and 64, there can be used the same materials as used for the substrate 2. The surface protective layers 62 and 64 can be laminated using the same adhesive as used in the above-mentioned adhesive layer 26.

When this IC card (IC tag 180) is pressed along the cut-away broken line 66, the cut-away broken line 66 is cut; thereby, the IC card is deactivated.

In this form, the shape of cut-away broken line, etc. are the same as in the first form; therefore, the same numerals are used for the same sites, and no explanation therefore is made.

Figure 13:
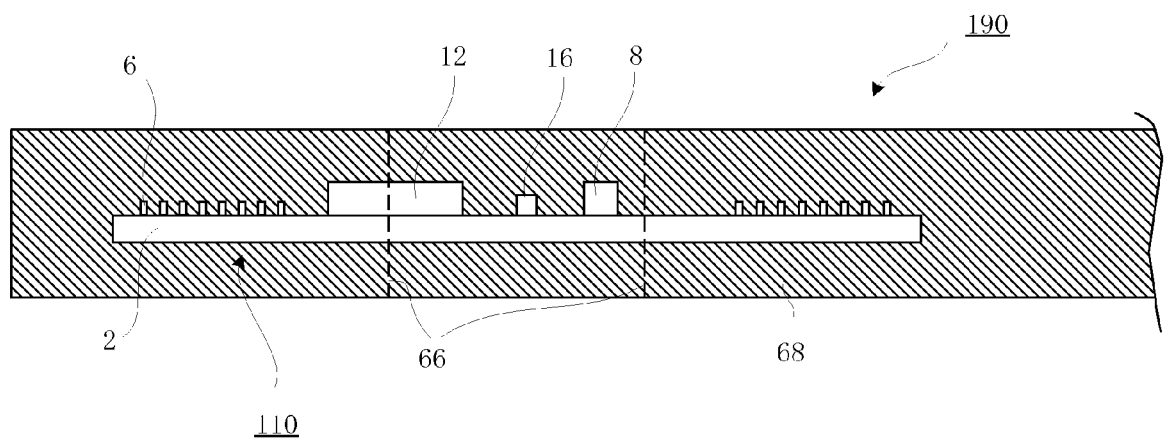
FIG. 13 is an end face partial view showing other example of the card-shaped IC tag of the present invention.

FIG. 13 shows other example of the constitution of an IC card-shaped IC tag 190 using an IC inlet 110.

In this IC tag 190, an IC inlet 110 is buried at the both sides in a resin layer 68 and is formed into a card shape. The resin layer 68 functions as a surface protective layer for the inlet 110.

The resin layer 68 is preferably formed by injection molding. The resin used in the resin layer 68 is preferably polyethylene terephthalate, polycarbonate, polyacrylonitrile-butadiene, polyethylene, polypropylene, etc.

EXAMPLES

Production Example 1

(Production of Antenna Circuits)

A group of 20 antenna circuits 100 shown in FIGS. 1 and 2 were produced according to the following method.

At first, a resist pattern was printed, by screen printing, on a laminate of a copper foil and a polyethylene terephthalate film (PET), i.e. NIKAFLEX (trade name) (a product of NIKKAN INDUSTRIES CO., LTD., Cu/PET=35 µm/50 µm). The resist pattern consisted of total 20 units arranged lengthwise and crosswise, each units comprising a plain coil circuit portion 6, opposed electrodes 8 and 12 and lead portions 18 and 20. The NIKAFLEX having such a resist pattern printed thereon was subjected to etching to remove unnecessary copper foil portions, to form a plain coil circuit portion 6, opposed electrodes 8 and 12 and lead portions 18 and 20.

Next, a taking-out electrode 4 was formed with a silver paste (DW 250 L-1, a product of Toyobo Co., Ltd.) at one corner of the plain coil circuit portion 6. Between the taking-out electrode 4 and the other opposed electrode 12 was formed an insulating layer 10 which covered the plain coil circuit portion 6, by using an insulating resist ink (ML 25089, a product of Acheson (Japan) Limited. Further, the taking-out electrode 4 and the other opposed electrode 12 were connected via jumper 14 by using the above silver paste. Incidentally, the jumper was formed by screen printing.

Then, the antenna circuits produced above in one group were cut into individual antenna circuits by using an extracting device installed cutting blade which has a shape for formation of cut-away broken line 22; simultaneously therewith, a cut-away broken line 22 was formed in each antenna circuit.

The lengths (cut lengths) a and b of the cut-away broken lines formed in the opposed electrodes 8 and 12 were a=3 mm and b=5 mm. In each cut-away broken line 22, the length Y of non-cut-away portion 34 and the length X of cut-away portion 32 was 1:3 (75% cut), and the length Y of non-cut-away portion was 0.5 mm.

Thus, antenna circuits 100 constituted as shown in FIGS. 1 and 2 were obtained.

Production Example 2

(Production of IC Inlets)

RFID-IC chip (I Code, a product of Philips Co.) was mounted in each antenna circuit produced above, to produce 20 IC inlets 110 constituted as shown in FIGS. 3 and 4.

In the mounting, a flip chip mounting machine (FB 30 T-M, a product of Kyushu Matsushita Electric Co., Ltd.) was used. In the mounting, there was also used an anisotropic conductive adhesive (TAP 0402 E, a product of KYOCERA chemical Corporation) as an adhesive, and thermocompression bonding was conducted for 7 seconds at 220° C. at 200 gf (1.96 N).

Example 1

(Production of IC Tags)

An acrylic type adhesive [PA-T1 (trade name), a product of LINTEC CORPORATION] was coated, in a thickness of 25 μm, on the side subjected to a release treatment of a release material [8KX (trade name), which is a product of LINTEC CORPORATION] obtained by coating a silicone-based resin on a glassine paper. The adhesive-coated release material was laminated onto the surface circuit-formed side of each IC inlet produced above. Thereby 20 IC tags having the same constitution as the IC tag 120 shown in FIG. 6 were produced.

The operation of the 20 IC tags was examined according to the Read/Write test using SLEV 400 (an I Code evaluation kit, a product of Philips).

After confirmation of the normal operation of each IC tag using SLEV 400, each IC tag was adhered onto a polypropylene resin plate. After 24 hours, the IC tags were peeled from the plate. As shown in FIG. 7, the IC chip portion remained on the polypropylene resin plate and the circuit was broken. The breakage occurred in all 20 IC tags.

Example 2

20 IC tags were produced in the same manner as in Example 1 except that the opposed electrodes 8 and 12 were formed with an Ag paste. The formation of the opposed electrodes 8 and 12 was conducted simultaneously with the formation of a jumper.

In the same manner as in Example 1, the normal operation of the IC tags was confirmed.

Then, each IC tag was adhered onto a polypropylene resin plate. After 24 hours, the IC tag was peeled from the plate. As a result, the circuits of all 20 IC tags were broken in the same condition as in Example 1 and the function of each IC tag had been deactivated.

Example 3

IC tags were produced in the same manner as in Example 1 except that the length of non-cut-away portion Y was changed to 0.2 mm.

In the same manner as in Example 1, the normal operation of the IC tags was confirmed. Then, each tag was adhered onto a polypropylene resin plate. After 24 hours, the IC tags were peeled from the plate. As a result, the circuits of all 20 IC tags were broken in the same condition as in Example 1 and the function of each IC tag had been deactivated.

Example 4

IC tags were produced in the same manner as in Example 1 except that the length of non-cut-away portion Y was changed to 1.0 mm.

In the same manner as in Example 1, the normal operation of the IC tags was confirmed. Then, each tag was adhered onto a polypropylene resin plate. After 24 hours, the IC tags were peeled from the plate. As a result, the circuits of all 20 IC tags were broken in the same condition as in Example 1 and the function of each IC tag had been deactivated.

Example 5

20 IC inlets were produced in the same manner as in Production Example 2 except that no cut-away broken line was formed. Onto both sides of each of the IC inlets was laminated a polyethylene terephthalate film colored in white (PET White) [CRISPER K 2323 (trade name), a product of Toyobo Co., Ltd., 125 μm] as a surface protective layer, using a hot-melt adhesive and a hot press, whereby 20 card-shaped IC tags shown in FIG. 12 were produced. Then, the IC tags were cut into each IC tag in the same manner as in Example 1 and, simultaneously therewith, a cut-away broken line was formed in each IC tag. The cut-away broken line pass through the surface circuit, the substrate and the PET White laminated onto the both sides of the IC inlet. The normal operation of each IC tag was confirmed, after which the cut-away broken line portion was pressed to break the circuit. As a result, there was physical breakage in all 20 IC tags and the function of IC tag had been deactivated.

Comparative Example 1

IC tags were produced in the same manner as in Example 1 except that no cut-away broken line was formed. The IC tags were cut into individual IC tags by using only an extracting device installed cutting blade which do not have a portion of shape for formation of cut-away broken line 22. Thereby were produced 20 IC tags having no cut-away broken line 22 formed therein. The normal operation of each IC tag was confirmed by using SLEV 400. Thereafter, each tag was adhered onto a polypropylene resin plate. After the lapse of 24 hours, the IC tags were peeled from the resin plate. 6 IC tags were broken in the same condition as in Example 1 and the function of IC tag had been deactivated. However, the remaining 14 IC tags could be peeled with no breakage of circuit.

The operation of the above 14 IC tags was examined by using SLEV 400, which indicated the normal operation of all 14 IC tags. From the above results, it was found that the IC tags of Comparative Example 1 were insufficient for prevention of falsification.

Example 6

20 IC inlets were produced in the same manner as in Production Example 2 except that no cut-away broken line was formed. Onto the surface circuit side of the IC inlets was laminated a PET film obtained by coating, in a thickness of 20 μm, an acrylic type pressure-sensitive adhesive (PA-TI, a product of LINTEC CORPORATION) on a polyethylene terephthalate (PET) film colored in white [CRISPER K 2411 (trade name), a product of Toyobo Corporation, 50 μm].

On the other side (opposite to the surface circuit side) of each substrate was coated the pressure-sensitive adhesive PA-T1 in a thickness of 20 μm. Thereonto was adhered a release material [8KX (trade name), a product of LINTEC CORPORATION] obtained by coating a silicone-based resin on a glassine paper. Then, in the same manner as in Example 1 was formed the same cut-away broken line as in Example 1 [a=3 mm, b=5 mm, non-cut-away portion length Y: cut-away portion length X=1:3 (75% cut), non-cut-away length Y=0.5 mm] so as to pass through from the PET film-attached side to the release material-attached side; simultaneously therewith, cutting into individual IC tags was conducted. By these operations, label-type IC tags were obtained.

The normal operation of the IC tags was confirmed by using SLEV 400. Then, each IC tag was adhered onto a polypropylene resin plate. After 24 hours, the IC tags were peeled from the plate. As a result, circuit breakage occurred in the same condition as in Example 1. The breakage was seen in all 20 IC tags.

The invention claimed is:

1. An IC tag for adhering onto an adherend which is subject to data control, the IC tag comprising:
   an IC inlet comprising a substrate consisting of a paper or a synthetic resin film, a surface circuit including a plain coil circuit portion and at least one pair of opposed electrodes individually connected with the two ends of the plain coil circuit portion which are formed on the substrate, and an IC chip mounted in connection with the opposed electrodes;
   an adhesive layer for adhering onto the adherend, wherein the adhesive layer is formed on at least one side of the substrate of the IC inlet; and
   a cut-away broken line formed so as to pass through the substrate and the surface circuit, wherein the cut-away broken line has at least a non-cut-away portion of 0.08 to 1.5 mm so that IC tag is deactivatable by peeling away the IC tag from the adherend such that the IC tag is cuttable along the cut-away broken line.

2. The IC tag according to claim 1, wherein the cut-away broken line forms a closed portion passing through at least the substrate and the opposed electrodes.

3. The IC tag according to claim 1, wherein the cut-away broken line has at least a non-cut-away portion of 0.08 to 1.5 mm in length.

4. An IC tag for adhering onto an adherend which is a subject to data control, the IC tag comprising:
   an IC inlet comprising a substrate consisting of a paper or a synthetic resin film, a surface circuit including a plain coil circuit portion and at least one pair of opposed electrodes individually connected with the two ends of the plain coil circuit portion which are formed on the substrate, and an IC chip mounted in connection with the opposed electrodes;
   a surface protective layer formed on one side of the IC inlet;
   an adhesive layer for adhering onto the adherend, wherein the adhesive layer is formed on the other side of the IC inlet; and
   a cut-away broken line formed so as to pass through the substrate, the surface circuit and the surface protective layer, wherein the cut-away broken line has at least a non-cut-away portion of 0.08 to 1.5 mm so that IC tag is deactivatable by peeling away the IC tag from the adherend such that the IC tag is cuttable along the cut-away broken line.

5. An IC tag according to claim 4, wherein the cut-away broken line forms a closed portion passing through at least the substrate, the opposed electrodes and the surface protective layer.

6. The IC tag according to claim 4 further comprising:
   an indicate layer formed on a surface of the surface protective layer.

* * * * *